United States Patent [19]

Okuda

[11] Patent Number: 4,966,630

[45] Date of Patent: Oct. 30, 1990

[54] ANTICORROSIVE PIGMENT COMPOSITION AND AN ANTICORROSIVE COATING COMPOSITION CONTAINING THE SAME

[75] Inventor: Masaaki Okuda, Takarazuka, Japan

[73] Assignee: Tayca Corporation, Osaka, Japan

[21] Appl. No.: 328,993

[22] Filed: Mar. 27, 1989

[51] Int. Cl.$^5$ .................. B32B 19/00; C04B 14/30; C09C 1/04; C09C 1/40

[52] U.S. Cl. ................. 106/426; 106/14.05; 106/14.12; 106/425; 428/403

[58] Field of Search ............... 106/14.44, 14.05, 14.12, 106/425, 461, 432, 426; 428/403

[56] References Cited

U.S. PATENT DOCUMENTS

| | | | |
|---|---|---|---|
| 2,277,393 | 3/1942 | Depew | 106/425 |
| 3,960,576 | 6/1976 | Carter et al. | 106/14.44 |
| 4,294,808 | 10/1981 | Wasel-Nielen et al. | 106/14.12 |
| 4,409,121 | 10/1983 | Latos et al. | 106/14.44 |
| 4,501,615 | 2/1985 | Reeder et al. | 106/14.39 |
| 4,505,748 | 3/1985 | Baxter | 106/287.34 |
| 4,842,645 | 6/1989 | Miyata et al. | 106/14.14 |

FOREIGN PATENT DOCUMENTS

| | | | |
|---|---|---|---|
| 1927635 | 5/1969 | Fed. Rep. of Germany | 106/14.05 |
| 0019345 | 2/1978 | Japan | 106/14.12 |
| 3133232 | 11/1978 | Japan | 106/14.05 |
| 0116768 | 9/1980 | Japan | 106/14.12 |
| 7007806 | 1/1982 | Japan | 106/14.12 |
| 8132048 | 8/1983 | Japan | 106/14.05 |
| 2169872 | 1/1986 | Japan | 106/14.12 |
| 2004753 | 1/1987 | Japan | 106/14.05 |

Primary Examiner—Prince E. Willis
Assistant Examiner—John Boyd
Attorney, Agent, or Firm—Millen, White & Zelano

[57] ABSTRACT

An anticorrosive pigment composition comprising (A) a slightly water-soluble condensed phosphoric acid salt and (B) at least one compound selected from the group consisting of zinc compounds, boric acid compounds and lead compounds, at least one of (A) and (B) having been chemically modified.

10 Claims, No Drawings

ANTICORROSIVE PIGMENT COMPOSITION AND AN ANTICORROSIVE COATING COMPOSITION CONTAINING THE SAME

BACKGROUND OF THE INVENTION

1. Field of the Invention

This invention relates to a novel anticorrosive pigment composition and an anticorrosive coating composition containing the same. More particularly, this invention relates to an anticorrosive pigment composition which is compatible with various coating vehicles, oily, solvent-type and aqueous, and exhibits remarkable anticorrosive effects.

2. Brief Description of the Prior Art

Anticorrosive pigments may be roughly classified into two categories, viz. (a) the conventional anti-corrosive pigments and (b) the newer relatively non-toxic anticorrosive pigments.

The most representative pigments of category (a) are red lead and zinc chromate. It is well known that these pigments exhibit remarkable rust-inhibitory effects but since they are rich in toxic metals, such as lead and chromium, these pigments present serious environmental problems. It is for this reason that there was a standing demand for low-toxicity or non-toxic anticorrosive pigments.

Many of the conventional anticorrosive pigments, such as zinc chromate, strontium chromate, red lead, basic lead chromate, lead suboxide, etc., have deep colors such as yellow, vermilion, black-gray, etc. and, therefore, a finish coat, if applied, must be applied in an increased film thickness or in an increased number of coats. To overcome this disadvantage, the advent of light-colored anticorrosive pigments have been awaited.

To meet this demand, development work on new anticorrosive pigments gained momentum and, as a result, several types of non-toxic or low-toxicity anticorrosive pigments of category (b) have emerged on the market. These pigments are either of the phosphoric acid type, such as zinc phosphate, calcium phosphate, etc., of the molybdic acid type, such as zinc molybdate etc., or of the boric acid type, such as barium metaborate etc.

However, compared with the earlier lead and chromate type pigments, these low-toxicity anticorrosive pigments have room for improvement in rust inhibitory effect.

The inventor of this invention made a thorough analysis of the disadvantages of these known low-toxicity anticorrosive pigments and a research for improving their relatively low rust inhibitory activity. As a result, it was found that a novel class of non-toxic anticorrosive pigments equivalent in rust-inhibitory effect to lead and chromate type pigments can be produced by subjecting anticorrosive pigments based on aluminum dihydrogen tripolyphosphate to adjustment of water solubles and chemical modification or subjecting zinc or boron compounds to chemical modification.

Furthermore, as described in Japanese Patent Application KOKAI 7806/1982, the inventor of this invention attempted to overcome the disadvantage of the conventional lead type anticorrosive pigments, namely their intense colors, and created new anticorrosive pigments having superior rust inhibitory activity and white or light colors by reacting aluminum dihydrogen triphosphate with lead compounds. However, these pigments were subsequently found to be not fully satisfactory in stability when incorporated in certain resin coating vehicles and stored.

However, it has been found that the addition of a chemically modified zinc compound resulted in a marked improvement in stability, thus broadening the scope of utility of these pigments to a remarkable extent.

SUMMARY AND OBJECTS OF THE INVENTION

It is a primary object of this invention to provide novel anticorrosive pigment compositions and novel anticorrosive coating compositions which exhibit remarkable rust-inhibiting effects. Particularly, the anticorrosive pigment compositions provided by this invention are compatible with various coating vehicles and, because of their white to pale colors, can be used advantageously for undercoating or primer coating purposes. These and other advantages of the anticorrosive pigment and coating compositions of this invention will become apparent as the following detailed description proceeds.

DETAILED DESCRIPTION OF THE INVENTION

This invention is described in detail below. The slightly water-soluble aluminum condensed phosphate aluminum salt which can be used in the anticorrosive pigment of this invention is not limited in kind and may be any species that can be used as anticorrosive pigments of various resin coating compositions.

Aluminum dihydrogen triphosphate, which is one of such salts, may be represented by the chemical formula $AlH_2P_3O_{10}.2H_2O$ and can be produced, for example, by the method described in Japanese Patent No. 856386. Thus, a mixture consisting of either aluminum or an aluminum-containing substance and a phosphorus-containing substance in a $P_2O_5/Al_2O_3$ mol ratio of 1 through 6 is heated at 90° to 450° C. with stirring to give an opaque solid substance, which is then re-heated at 300 to 450° C. for dehydration and crystallization. This procedure gives aluminum dihydrogen triphosphate which can be successfully used in the practice of this invention. The phosphorus-containing substance mentioned above may be virtually optional in kind, and phosphoric acid and phosphorus pentoxide may be mentioned as examples.

The aluminum-containing substance is also virtually optional in kind and may for example be aluminum hydroxide, aluminum oxide or the like.

The zinc compound to be used in the practice of this invention may, for example, be zinc oxide, basic zinc carbonate, zinc borate or the like. Particularly preferred is zinc oxide.

For the chemical modification of zinc oxide, such techniques as surface modification with a metal fatty acid salt and double decomposition with an organic phosphonic acid compound are useful.

The metal fatty acid salt mentioned above is exemplified by stearates such as aluminum stearate, calcium stearate, zinc stearate, etc., oleates such as aluminum oleate, calcium oleate, zinc oleate, etc., various myristates, palmitates, laurates and so on. Particularly preferred is aluminum stearate.

To achieve the surface modification of zinc oxide with aluminum stearate, one may simply dry-blend 1 to 5 weight % of aluminum stearate with zinc oxide and pulverize the mixture in a jet mill or the like. This simple procedure gives the desired surface-modified zinc oxide.

Such surface-modified zinc oxide can also be prepared by a wet process which comprises suspending zinc oxide in warm water at 60° to 100° C., adding 1 to 5 weight % each of a soluble metal fatty acid salt, e.g. sodium stearate, and a soluble aluminum source, e.g. aluminum polychloride, and subjecting the resulting slurry to dehydration, drying and pulverization.

The following is an example of the reaction between zinc oxide and an organic phosphonic acid compound.

Suitable examples of said organic phosphonic acid compound (salt) include aminoalkylenephosphonic acids and their salts, which may be represented by the general formula $R_mN[(CH_2)_nP(O)(OZ)_2]_{3-n}$ . . . (I) wherein R is a lower alkyl group; m is equal to 0 to 3; n is equal to 1 to 2; Z is a hydrogen atom, an alkali metal or an ammonium group], ethylenediaminetetraalkylenephosphonic acids and their salts, which may be represented by the following general formula

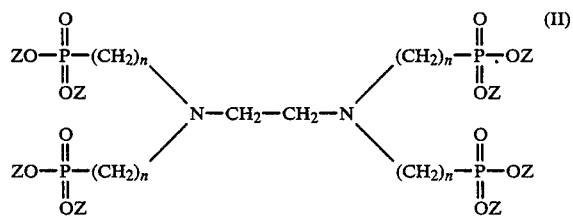

wherein n is an integer of 1 to 3; Z is as defined in the preceding formula, and alkylmethane-1-hydroxy-1,1-diphosphonic acids and their salts, which may be represented by the general formula

wherein R is a hydrogen atom or a lower alkyl group; Z is as defined in the preceding formulas.

Of the compounds of the above general formulas (I), (II) and (III), the compounds of formula (I) include, among others, nitrilotrismethylenephosphonic acid, nitrilotrisethylenephosphonic acid, nitrilotrispropylenephosphonic acid, nitrilodiethylmethylenephosphonic acid and nitrilopropylbismethylenephosphonic acid; the compounds of formula (II) include, among others, ethylenediaminetetramethylenephosphonic acid, ethylenediaminetetraethylenephosphonic acid and ethylenediaminetetrapropylenephosphonic acid; and the compounds of formula (III) include, among others, methane-1-hydroxy-1,1-diphosphonic acid and ethane-1-hydroxy-1,1-diphosphonic acid. As the salts of such acids, the salts available on partial or complete neutralization with sodium, potassium or ammonium groups may be mentioned. These compounds of formulas (I), (II) and (III) may be used either alone or in combination.

The reaction between zinc oxide and an organic phosphonic acid according to this invention under wet conditions gives rise to a white insoluble substance. This reaction can be conducted batchwise or continuously and a uniform wet reaction can be achieved by the ordinary stirring method, mixing by means of a static mixer, shear mixing, or a combination of such techniques.

As to the specific procedure that can be followed, an aqueous solution of the organic polyphosphonic acid compound may be added to an aqueous slurry of zinc oxide. The reverse is, of course, possible.

The product slurry obtained by the initial reaction between zinc oxide and the acid of formula (I) may be heat-treated, for example at 50° to 100° C. for 10 minutes to 24 hours, so as to positively carry the salt-forming reaction to completion. The precipitated salt is then separated and rinsed a few times to remove the water-soluble matter as much as possible. Then, the product is filtered, dried and pulverized to give the zinc polyphosphonate.

In the above reaction, the mol ratio of zinc oxide to etidronic acid compound 1/1 to 6/1 and preferably 1.2/1 to 5.4/1.

Mixing of aluminum dihydrogen tripolyphosphate with aluminum stearate-treated zinc oxide can be effected by simple dry blending and the ratio of them is 10/0.1 to 10/20 and preferably 10/1 to 10/10.

When aluminum dihydrogen tripolyphosphate is used in combination with etidronic acid-treated zinc oxide, they can be simply dry-blended or, if necessary, they may be reacted under wet conditions in warm water at 60° to 100° C., followed by filtration, drying and pulverization. The ratio of aluminum dihydrogen tripolyphosphate to etidronic acid-treated zinc oxide is 10/0.1 to 10/20 by weight and preferably in the range of 10/1 to 10/8.

When aluminum dihydrogen tripolyphosphate is reacted with a lead compound, there is no particular limitation on the kind of lead compound only if the latter is sufficiently reactive to the former. Thus, various salts of lead oxide, basic lead carbonate, lead sulfate and lead halides can be employed. However, lead monoxide is particularly useful. The reaction of aluminum dihydrogen tripolyphosphate with lead monoxide, for instance, can be conducted in warm water at 60° to 100° C. and the reaction product be dehydrated, dried and pulverized.

The product may be dry-blended or, to provide for enhanced resin stability, reacted under wet conditions with the etidronic acid-treated zinc oxide followed by dehydration, drying and pulverization. When a slightly soluble substance is chosen as the lead compound, it is preferable to use a mechanochemical process employing of a sand grind-mill, ball mill, vibro-energy mill or the like.

While aluminum dihydrogen tripolyphosphate is used as a reactant in the practice of this invention, the X-ray (Cu Kα) diffraction pattern of this substance has a definite peak at $2\theta = 11.2°$ and, therefore, the qualitative and quantitative determination of aluminum dihydrogen tripolyphosphate can be carried out by taking advantage of this diffraction pattern. When aluminum dihydrogen tripolyphosphate has reacted completely with the lead compound, the above diffraction peak disappears. For purposes of this invention, the product may be one in which the reaction has progressed to a stage corresponding to a relative peak height of not more than 50%.

The application of a mechanochemical procedure may be useful for the treatment of etidronic acid-treated zinc oxide, too.

While there is no particular limitation on the ratio of aluminum dihydrogen tripolyphosphate to the lead compound, the preferred mol ratio is 3/1 to 1/20. The ratio of the resulting reaction product to etidronic acid-treated zinc oxide is preferably in the range of 100/10 to 100/200 by weight.

In the anticorrosive pigment composition of this invention comprising said slightly water-soluble condensed phosphate, aluminum stearate- or etidronic acid-modified zinc oxide and boric acid compound, the boric acid compound may for example be barium metaborate, calcium borate, magnesium borate or the like, although barium metaborate is particularly useful. This anticorrosive pigment composition can be produced by mere dry-blending and while the proportions of the components are not particularly critical, the preferred ratio of aluminum dihydrogen tripolyphosphate to the above chemically modified zinc oxide is in the range of 20/1 to 1/20 by weight.

The ratio of said chemically modified zinc oxide to barium metaborate is not particularly critical, either, but the preferred ratio is 20/1 through 1/20.

The surface treatment of aluminum dihydrogen tripolyphosphate with aluminum stearate can for example be carried out by dry-blending aluminum dihydrogen triphosphate with 1 to 5 percent by weight of aluminum stearate and pulverizing the mixture in a jet mill or the like. The surface-modified aluminum dihydrogen tripolyphosphate can also be prepared by a wet method. Thus, while aluminum dihydrogen tripolyphosphate is stirred in warm water at 60 to 100° C, 1 to 5 percent by weight each of a water-soluble metal fatty acid salt, such as sodium stearate, and a water-soluble aluminum source, such as aluminum polychloride, are added and the resulting slurry is subjected to dehydration, drying and pulverization.

The blending of said aluminum dihydrogen tripolyphosphate, which has been chemically modified with aluminum stearate, with either said zinc oxide, which has been treated with aluminum stearate or etidronic acid, or zinc oxide can be carried out by dry-blending and while the blending ratio is not particularly critical, the generally preferred range is 20/1 through 1/20.

The surface modification of barium metaborate with aluminum stearate can be simply accomplished by dry-blending barium metaborate with 1 to 5 percent by weight of aluminum stearate and pulverizing the mixture in a jet mill or the like. The surface-modified barium metaborate can also be prepared by a wet method. Thus, while barium metaborate is suspended and stirred in warm water at 60° to 100° C., 1 to 5 percent by weight each of a metal fatty acid salt such as sodium stearate and a water-soluble aluminum source such as aluminum polychloride are added and the resulting slurry is subjected to dehydration, drying and pulverization.

The composition comprising said aluminum dihydrogen tripolyphosphate and aluminum stearate-treated barium metaborate can be prepared by mere dry-blending, and while the blending ratio is not particularly critical, the effective range is 20/1 through 1/20 by weight.

The coating composition containing such an anticorrosive pigment composition according to this invention can be prepared using one or more of the vehicles or bases commonly used for coating purposes, such as boiled oil, oil varnish, alkyd resin, phenolic resin, amino resin, epoxy resin, urethane resin, vinyl resin, acrylic resin, fluororesin, silicone resin, polyester resin and other resin varnishes, chlorinated rubber, cyclized rubber and other rubber derivatives, various cellulose derivatives and so forth.

In dispersing the anticorrosive pigment composition in such a vehicle or base, the respective components may be independently added but where the vehicle or the like is not stable enough, the material or components obtained by the above-described wet method or methods are preferably used.

EXAMPLES

The following examples are intended to illustrate this invention in further detail and should by no means be construed as being limitative. It should be understood that all parts in the examples are by weight.

A Production Examples

A-1 Production of aluminum dihydrogen tripolyphosphate

A ceramic crucible was charged with a mixture consisting of 73.7 g of α-alumina and 500 g of 85% phosphoric acid($P_2O_5/Al_2O_3=3$) and the internal temperature was gradually increased to 220° C. in 2 hours with stirring. The resulting opaque hydrous semi-solid was dehydrated in an electric furnance at 300° C. for 5 hours to give aluminum dihydrogen tripolyphosphate.

A-2 Reaction of aluminum dihydrogen tripolyphosphate with lead monoxide

In 300 ml of warm water at 80° C. were dispersed 50 g of the aluminum dihydrogen tripolyphosphate prepared above and 35 g of lead monoxide. Because of the yellow color of lead monoxide, the resulting slurry was initially yellow in color. The mol ratio of aluminum dihydrogen triphosphate to lead monoxide was 1:1. This slurry was transferred to a sand grind mill for mechanochemical reaction. During this reaction, the intensity ratio of the X-ray diffraction peak at $2\theta=11.2°$, which is characteristic of aluminum dihydrogen tripolyphosphate, showed the following change.

| Reaction time (min.) | Peak intensity ratio |
| --- | --- |
| 0 | 1.00 |
| 3 | 0.70 |
| 5 | 0.40 |
| 7 | 0.22 |
| 10 | 0.09 |

Thus, the slurry after 10 minutes of the above mechanochemical reaction showed a considerably diminished X-ray diffraction intensity at $2\theta=11.2°$ and its initial yellow color changed to white. This slurry was dehydrated, dried and pulverized.

A-3 Reaction of aluminum dihydrogen tripolyphosphate with aluminum stearate

To 300 parts of water was added 100 parts of the aluminum dihydrogen tripolyphosphate prepared above and the mixture was heated at 70±5° C. Then, 3 parts of sodium stearate and 3 parts of aluminum polychloride were added, followed by stirring at that temperature for about 1 hour. The mixture was then subjected to dehydration, drying and pulverization to give aluminum stearate-treated aluminum dihydrogen tripolyphosphate.

Separately, 1000 parts of aluminum dihydrogen tripolyphosphate were dry-blended with 30 parts of aluminum stearate and the mixture was pulverized in a jet mill to give aluminum stearate-treated aluminum dihydrogen tripolyphosphate.

A-4 Reaction of zinc oxide with etidronic acid (1)

First, 790 g of a solution of etidronic acid (158 g as etidronic acid) was heated to 70° C. and 461 g of a zinc oxide slurry (92.2 g as zinc oxide) held at 70° C. was added dropwise over about 30 minutes with constant stirring. The mol ratio of zinc oxide to etidronic acid was 1.5/1. This slurry was stirred at 60° to 70° C. for 4 hours, after which it was cooled to room temperature. The slurry was then filtered and the dehydrated cake was washed with distilled water 3 to 5 times. It was then filtered, dried and pulverized to give zinc etidronate.

A-5 Reaction of zinc oxide with etidronic acid (2)

First, 1030 g of a solution of etidronic acid (206 g as etidronic acid) was heated to 70° C. and 2035 g of a zinc oxide slurry (407 g as zinc oxide) held at 70° C. was added dropwise over about 2 hours with stirring. The mol ratio of zinc oxide to etidronic acid was 5/1. This slurry was stirred at 60° to 70° C. for 5 hours and, then, cooled to room temperature. The slurry was filtered and the dehydrated cake was washed with distilled water 3 to 5 times and, then, subjected to dehydration, drying and pulverization to give a zinc oxide/zinc etidronate composition.

A-6 Reaction of barium metaborate with aluminum stearate

To 150 parts of water was added 50 parts of barium metaborate and the mixture was heated to 70±5° C. Then, 3 parts of sodium stearate and 3 parts of aluminum polychloride were added and the mixture was stirred at 70±5° C. for about 1 hour. It was then subjected to dehydration, drying and pulverization to give aluminum stearate-treated barium metaborate.

Separately, 100 parts of barium metaborate was dry-blended with 3 parts of aluminum stearate and the mixture was pulverized in a jet mill to give a similar product.

A-7 Reaction of zinc oxide with aluminum stearate

To 1500 parts of water was added 500 parts of zinc oxide, followed by heating to 70±5° C. Then, 4 parts of sodium stearate and 4 parts of aluminum polychloride were added and the mixture was stirred at 70±5° C. for about 1 hour. It was then subjected to dehydration, drying and pulverization to give aluminum stearatetreated zinc oxide.

Separately, 1000 parts of zinc oxide was dry-blended with 40 parts of aluminum stearate and the mixture was pulverized in a jet mill to give a similar product.

B Production of the anticorrosive pigment compositions used in the examples

B-1

An anticorrosive pigment composition was produced by dry-blending 100 parts of the aluminum stearatetreated aluminum dihydrogen tripolyphosphate prepared in Production Example A-3 with 40 parts of the aluminum stearate-treated zinc oxide prepared in Production Example A-7.

B-2

An anticorrosive pigment composition was produced by dry-blending 100 parts of the aluminum stearatetreated aluminum dihydrogen tripolyphosphate prepared in Production Example A-3 with 20 parts of the etidronic acid-treated zinc oxide prepared in Production Example A-5.

B-3

An anticorrosive pigment composition was produced by dry-blending 100 parts of the aluminum dihydrogen tripolyphosphate prepared in Production Example A-1 with 40 parts of the aluminum stearate-treated zinc oxide prepared in Production Example A-7.

B-4

An anticorrosive pigment composition was produced by dry-blending 100 parts of the aluminum dihydrogen tripolyphosphate prepared in Production Example A-1 with 20 parts of the etidronic acid-treated zinc oxide prepared in Production Example A-5.

B-5

An anticorrosive pigment composition was produced by dry-blending 40 parts of the aluminum dihydrogen tripolyphosphate prepared in Production Example A-1 with 40 parts of the aluminum stearate-treated zinc oxide prepared in Production Example A-7 and 20 parts of barium metaborate.

B-6

An anticorrosive pigment composition was produced by dry-blending 40 parts of the aluminum dihydrogen tripolyphosphate prepared in Production Example A-1 with 20 parts of the etidronic acid-treated zinc oxide prepared in Production Example A-5 and 40 parts of barium metaborate.

B-7

An anticorrosive pigment composition was produced by dry-blending 100 parts of the aluminum dihydrogen tripolyphosphate prepared in Production Example A-1 with 40 parts of the aluminum stearate-treated barium metaborate prepared in Production Example A-6.

B-8

An anticorrosive pigment composition was produced by reacting mixture of 100 parts of the reaction aluminum dihydrogen tripolyphosphate and lead monoxide as prepared in Production Example A-2 with 20 parts of the etidronic acid-treated zinc oxide prepared in Production Example A-5 in warm water at 70±5° C. and subjecting the reaction product to dehydration, drying and pulverization.

B-9

An anticorrosive pigment composition was produced by dry-blending 100 parts of the reaction mixture of aluminum dihydrogen tripolyphosphate and lead monoxide as prepared in Production Example A-2 with 20 parts of the etidronic acid-treated zinc oxide prepared in Production Example A-4.

C Production of reference pigment compositions

C-1

A reference anticorrosive pigment composition was produced by dry-blending 10 parts of the aluminum dihydrogen tripolyphosphate prepared in Production Example A-1 with 10 parts of zinc oxide.

C-2

A reference anticorrosive pigment composition was produced by dry-blending 20 parts of the aluminum dihydrogen tripolyphosphate prepared in Production Example A-1 with 40 parts of zinc oxide and 40 parts of barium metaborate.

C-3

A reference anticorrosive pigment composition was produced by dry-blending 10 parts of the aluminum dihydrogen tripolyphosphate prepared in Production Example A-1 with 8 parts of barium metaborate.

C-4

The composition prepared in Production Example A-2 was used as a reference anticorrosive pigment composition.

C-5

A reference anticorrosive pigment composition was produced by dry-blending 10 parts of the reaction mixture of aluminum dihydrogen tripolyphosphate and lead monoxide as prepared in Production Example A-2 with 10 parts of zinc oxide.

EXAMPLES 8-1 Anticorrosive coating compositions of the air drying medium oil alkyd resin type
(a) Formulation

|  |  |  |
|---|---|---|
| Anticorrosive pigment (b) |  | 5.6 |
| Precipitated barium sulfate |  | 10.0 |
| Finely divided talc SSS |  | 14.8 |
| Ochre |  | 5.6 |
| Resin (N.V. 50%) | *4 | 40.0 (20.0) |
| Dryer | *5 | 1.0 |
| Anti-skinning agent | *6 | 0.3 |
| Antisagging agent | *7 | 1.0 |
| Mineral spirit |  | 8.0 |
| Xylol |  | 4.0 |
| Total |  | 100.0 |

*4 Beckosol No. 1334 EL, manufactured by Dainippon Ink and Chemicals, Inc.
*5 24% lead naphthenate/6% cobalt naphthenate = 2:1 (w/w)
*6 Disparlon No. 501, manufactured by Kusumoto Chemical Industries, Ltd.
*7 Disparlon No. 4200-20, manufactured by Kusumoto Chemical Industries, Ltd.

(b) Anticorrosive pigment composition
(1) Anticorrosive pigment of this invention (B-1)
(2) Anticorrosive pigment of this invention (B-2)
(3) Anticorrosive pigment of this invention (B-3)
(4) Anticorrosive pigment of this invention (B-5)
(5) Anticorrosive pigment of this invention (B-7)
(6) Reference anticorrosive pigment (C-1)
(7) Reference anticorrosive pigment (C-2)
(8) Reference anticorrosive pigment (C-3).
(9) Zinc phosphate
(10) Zinc chromate (ZPC)
(c) Coating method and conditions
Method: Bar coater, No. 46
Substrate: Degreased cold rolled steel panel JIS G 3141 (SPCC-SB), manufactured by Japan Test Panel Industries, Ltd.
Film thickness: 30 μm
Drying: Room temperature, 1 week
(d) Test method
Salt spray test: 5% aqueous NaCl, spray pressure 1 kg/cm², spray chamber internal temperature 35° C, test time 168 hours. p (e) Results

| Anticorrosive pigment | Rust | Blister |
|---|---|---|
| Anticorrosive pigment of this invention (B-1) | 5 | 5 |
| Anticorrosive pigment of this invention (B-2) | 5 | 5 |
| Anticorrosive pigment of this invention (B-3) | 5 | 5 |
| Anticorrosive pigment of this invention (B-5) | 5 | 5 |
| Anticorrosive pigment of this invention (B-7) | 4 | 5 |
| Reference anticorrosive pigment (C-1) | 5 | 4 |
| Reference anticorrosive pigment (C-2) | 4 | 4 |
| Reference anticorrosive pigment (C-3) | 4 | 3 |
| Zinc phosphate | 2 | 2 |
| Zinc chromate (ZPC) | 4 | 3 |

Good 5 > 4 > 3 > 2 > 1 > Poor 8-2 Anticorrosive coating compositions of the air drying water-soluble alkyd resin type
(a) Formulation

|  |  |  |
|---|---|---|
| Anticorrosive pigment (b) |  | 5.9 |
| Titanium dioxide |  | 5.8 |
| Calcium carbonate |  | 6.5 |
| Finely divided talc SSS |  | 13.1 |
| Precipitated barium sulfate |  | 6.5 |
| Resin (N.V. 50%) | *1 | 42.0 (1.0) |
| Dryer | *2 | 0.9 |
| 20% aqueous butyl-cellosolve | *3 | 19.3 |
| Total |  | 100.0 |

*1 Arolon 376, manufactured by Nippon Shokubai Kogaku Kogyo Co., Ltd.
*2 24% lead naphthenate/6% cobalt naphthenate = 2:1 (w/w)
*3 Butyl-cellosolve/water = 20:80

(b) Anticorrosive pigment
(1) Anticorrosive pigment of this invention (B-6)
(2) Reference anticorrosive pigment (C-2)
(3) Zinc phosphate
(4) Zinc molybdate
(5) Zinc chromate (ZPC)
(c) Coating method and conditions
Method: Bar coater, No. 46
Substrate: Degreased cold rolled steel panel JIS G 3141 (SPCC-SB), manufactured by Japan Test Panel Industries, Ltd.
Film thickness: 30 μm
Drying: Room temperature, 1 week
(d) Test method
Salt spray test: 5% aqueous NaCl, spray pressure 1 kg/cm², chamber internal temperature 35° C, test time 216 hours
(e) Results

| Anticorrosive pigment | Rust | Blister |
|---|---|---|
| Anticorrosive pigment of this invention (B-6) | 5 | 5 |
| Reference anticorrosive pigment (C-2) | 3 | 3 |
| Zinc phosphate | 2 | 1 |
| Zinc molybdate | 3 | 3 |
| Zinc chromate (ZPC) | 3 | 4 |

Good 5 > 4 > 3 > 2 > 1 Poor 8-3 Anticorrosive coating compositions of the air drying acrylic resin type
(a) Formulation

|  |  |  |
|---|---|---|
| Anticorrosive pigment (b) |  | 18.3 |
| Titanium dioxide |  | 16.1 |
| Calcium carbonate |  | 8.3 |
| Finely divided talc SSS |  | 5.6 |
| Resin (N.V. 50%) | *8 | 31.2 (15.6) |
| Mineral spirit |  | 9.4 |
| Xylol |  | 8.7 |
| Total |  | 100.2 |

*8 Acrydic A-126-50, manufactured by Dainippon Ink and Chemicals, Inc.

(b) Anticorrosive pigment
(1) Anticorrosive pigment of this invention (B-4)
(2) Reference anticorrosive pigment (C-1)
(3) Zinc phosphate
(c) Coating method and conditions
Method: Bar coater, No. 46
Substrate: Degreased cold rolled steel panel JIS G 3141 (SPCC-SB), manufactured by Japan Test Panel Industries, Ltd.

Film thickness: 30 μm
Drying: Room temperature, 3 days
(d) Test method
Salt spray test: 5% aqueous NaCl, spray pressure 1 kg/cm$^2$, chamber internal temperature 35° C., test time 96 hours
(e) Results

| Anticorrosive pigment | Rust | Blister |
|---|---|---|
| Anticorrosive pigment of this invention (B-4) | 5 | 5 |
| Reference anticorrosive pigment (C-1) | 4 | 4 |
| Zinc phosphate | 2 | 1 |

Good 5 > 4 > 3 > 2 > 1 Poor 8-4 Anticorrosive coating compositions of the air drying epoxy resin type
(a) Formulation

| Anticorrosive pigment (b) | | 6.2 | |
|---|---|---|---|
| Titanium dioxide | | 4.4 | |
| Finely divided talc SSS | | 4.3 | |
| Precipitated barium sulfate | | 24.8 | |
| Resin (N.V. 50%) | *9 | 26.5 | (16.5) |
| Curing agent (N.V. 100%) | *10 | 9.2 | |
| n-Butanol | | 24.6 | |
| Total | | 100.0 | |

*9 Epikote 1007, manufactured by Shell Chemical Co., Ltd.
*10 Versamide 230, manufactured by Henkel-Hakusui Co., Ltd.

(b) Anticorrosive pigment
(1) Anticorrosive pigment of this invention (B-8)
(2) Anticorrosive pigment of this invention (B-9)
(3) Reference anticorrosive pigment (C-4)
(4) Reference anticorrosive pigment (C-5)
(5) Zinc phosphate
(6) Zinc chromate (ZPC)
(c) Coating method and conditions
Method: Bar coater, No. 30
Substrate: Zinc phosphate-treated steel panel JIS G 3141 (SPCC-SB), manufactured by Japan Test Panel Industries, Ltd.
Film thickness: 20 μm
Drying Room temperature, 7 days
(d) Test method
Salt spray test: 5% aqueous NaCl, spray pressure 1 kg/cm$^2$, chamber internal temperature 35° C., test time 288 hours
(e) Results

| Anticorrosive pigment | Rust | Blister |
|---|---|---|
| Anticorrosive pigment of this invention (B-8) | 5 | 5 |
| Anticorrosive pigment of this invention (B-9) | 5 | 4 |
| Reference anticorrosive pigment (C-4) | 4 | 3 |
| Reference anticorrosive pigment (C-5) | 4 | 4 |
| Zinc phosphate | 1 | 1 |
| Zinc chromate (ZPC) | 1 | 1 |

Good 5 > 4 > 3 > 2 > 1 Poor 8-5 Storage stability test
A sample of each test coating composition was filled into a ¼-liter cylindrical can up to about 80% of the capacity. After hermetic sealing, the can was maintained in an electric incubator at a constant temperature of about 40° C. for 30 hours. The can was then taken out and the condition of its contents was compared with the initial condition to evaluate the stability of the coating composition.

| Sample | Result |
|---|---|
| Anticorrosive pigment of this invention (B-8) | Substantially no change |
| Reference anticorrosive pigment (C-4) | A tendency of increased viscosity |
| Zinc phosphate | Substantially no change |
| Zinc chromate (ZPC) | Substantially no change |

It is clear from the foregoing examples that the anticorrosive pigments and coating compositions containing the same according to this invention are not only superior to the conventional anticorrosive pigments and compositions in the degree of rust inhibition but also in their whiteness. Another advantage of the pigments and coating compositions of this invention is their low toxicity.

What is claimed is:

1. In an anticorrosive pigment composition comprising a mixture of (A) aluminum dihydrogen tripolyphosphate and (B) zinc oxide, the improvement wherein (A) and (B) are present in the composition at a weight ratio from about 10:1 to about 10:20 and at least one thereof is surface treated with about 1 to about 5% by weight of aluminum stearate.

2. The anticorrosive pigment composition of claim 1, wherein only the aluminum dihydrogen tripolyphosphate is surface treated with aluminum stearate.

3. The anticorrosive pigment composition of claim 1, wherein only the zinc oxide is surface treated with aluminum stearate.

4. The anticorrosive pigment composition of claim 1, wherein both the aluminum dihydrogen tripolyphosphate and the zinc oxide are surface treated with aluminum stearate.

5. The anticorrosive pigment composition of claim 2, wherein the zinc oxide is surface treated with etidronic acid at a molar ratio of zinc oxide to etidronic acid of about 1:1 to about 6:1.

6. The anticorrosive pigment composition of claim 3, which contains barium metaborate at a weight ratio to the zinc oxide of about 20:1 to about 1:20.

7. An anticorrosive coating composition comprising a dispersion of the anticorrosive pigment composition of claim 1 in an oily, solvent-type or aqueous vehicle.

8. An anticorrosive coating composition comprising a dispersion of the anticorrosive pigment composition of claim 2 in an oily, solvent-type or aqueous vehicle.

9. An anticorrosive coating composition comprising a dispersion of the anticorrosive pigment composition of claim 3 in an oily, solvent-type or aqueous vehicle.

10. An anticorrosive coating composition comprising a dispersion of the anticorrosive pigment composition of claim 4 in an oily, solvent-type or aqueous vehicle.

* * * * *